(12) United States Patent
Gao et al.

(10) Patent No.: US 9,960,643 B2
(45) Date of Patent: May 1, 2018

(54) BIDIRECTIONAL COMMUNICATION DEMODULATION FOR WIRELESS CHARGING SYSTEM

(71) Applicant: FREESCALE SEMICONDUCTOR, INC., Austin, TX (US)

(72) Inventors: Xiang Gao, Shanghai (CN); Zhendong Fei, Shanghai (CN); Wanfu Ye, Shanghai (CN)

(73) Assignee: NXP USA, INC., Austin, TX (US)

( * ) Notice: Subject to any disclaimer, the term of this patent is extended or adjusted under 35 U.S.C. 154(b) by 312 days.

(21) Appl. No.: 14/942,977

(22) Filed: Nov. 16, 2015

(65) Prior Publication Data

US 2016/0336785 A1 Nov. 17, 2016

(30) Foreign Application Priority Data

May 11, 2015 (CN) .......................... 2015 1 0405430

(51) Int. Cl.
*H02J 50/80* (2016.01)
*H02J 7/00* (2006.01)
*H02J 7/02* (2016.01)

(52) U.S. Cl.
CPC ............ *H02J 50/80* (2016.02); *H02J 7/0004* (2013.01); *H02J 7/025* (2013.01); *H02J 7/00* (2013.01)

(58) Field of Classification Search
CPC .......... H03M 1/665; H03M 5/08; H03M 5/12; H02J 7/025; H02J 5/005; H02J 17/00; H02J 7/0004; H02J 2007/0096; H04B 5/0031; H04B 5/0037; H04B 5/0062; H04B 5/02; H04L 67/148; H04L 67/34; H04L 2209/80

See application file for complete search history.

(56) References Cited

U.S. PATENT DOCUMENTS

| 4,485,347 | A | 11/1984 | Hirasawa et al. |
|---|---|---|---|
| 7,881,409 | B2 | 2/2011 | Ghovanloo et al. |
| 9,660,486 | B2 * | 5/2017 | Lee .......................... H02J 50/12 |
| 2001/0033197 | A1 | 10/2001 | Nebel |
| 2002/0150179 | A1 * | 10/2002 | Leis ...................... G11B 5/5526 375/340 |

(Continued)

OTHER PUBLICATIONS

Of W.P. Choi et al. "Bidirectional Communication Technique for wireless Battery Charging System & Portable Consumer Electronics" 2010 IEEE (IDS filed Nov. 16, 2015).*

(Continued)

*Primary Examiner* — Linh Nguyen
(74) *Attorney, Agent, or Firm* — Charles E. Bergere

(57) ABSTRACT

A system and method for demodulating a wireless power signal onto which binary data has been modulated involves processing the wireless power signal with analog circuitry to produce a modified power signal in accordance with the type of demodulation used, periodically capturing digital samples of the modified power signal to produce a series of digital samples, applying, with an MCU, at least two digital filtering algorithms to the digital samples to determine transitions associated with the modulation, and recovering, with the MCU, the binary data as a function of the determined transitions. The demodulator is applicable to bidirectional power transfer capable devices and includes algorithms that can be applied similarly to both ASK and FSK demodulations with little or no modification.

17 Claims, 10 Drawing Sheets

(56) References Cited

U.S. PATENT DOCUMENTS

| | | | |
|---|---|---|---|
| 2002/0163748 A1* | 11/2002 | Patapoutian | G11B 5/59688 360/51 |
| 2004/0113790 A1* | 6/2004 | Hamel | A61F 2/4657 340/572.1 |
| 2009/0218407 A1* | 9/2009 | Rofougaran | G06K 19/0724 235/492 |
| 2011/0221569 A1* | 9/2011 | Hamel | A61B 5/0031 340/9.1 |
| 2012/0212290 A1 | 8/2012 | Hafuka | |
| 2012/0326657 A1* | 12/2012 | Oettinger | H02J 7/025 320/108 |
| 2013/0063083 A1* | 3/2013 | Park | H02J 7/0013 320/108 |
| 2016/0182264 A1* | 6/2016 | Chen | H04L 27/06 375/320 |
| 2016/0373014 A1* | 12/2016 | Pflaum | H02M 3/33523 |
| 2017/0317764 A1* | 11/2017 | Kim | H03M 13/1505 |

OTHER PUBLICATIONS

Xiang Gao; "Demodulating Communication Signals of Qi-Compliant Low-Power Wireless Charger Using MC56F8006 DSC", Freescale Semiconductor, Inc., Application Note AN4701, Rev. 0, Mar. 2013.

Xiang Gao; "Low-Power Wireless Charger Transmitter Design Using MC56F8006 DSC", Freescale Semiconductor Inc., Application Note AN4705, Rev. 0, Mar. 2013.

Choi, W.P., Ho, W.C., Liu, X., and Hui, S.Y.R.; "Bidirectional Communication Techniques for Wireless Battery Charging Systems & Portable Consumer Electronics", IEEE 978-1-4244-4783-1/10, 2010.

Anon; "Qi System Description Wireless Power Transfer Volume I: Low Power Part 1: Interface Definition", Version 1.1.2, Wireless Power Consortium, Jun. 2013.

* cited by examiner

BIDIRECTIONAL COMMUNICATION DEMODULATION FOR WIRELESS CHARGING SYSTEM

BACKGROUND

The present invention relates generally to wireless charging systems, and more particularly to methods of demodulating communication within wireless charging systems.

Mobile electronic products, already in wide use throughout much of the world today, are likely to see further increases in adoption rates as an ever-increasing number of people put into service an ever-increasing number and variety of mobile phones, tablets, cameras, handheld gaming consoles, plug-in hybrid and fully-electric vehicles, electric-powered drones and other aircraft, and related products.

Most of these products are powered by batteries or similar energy-storage devices that need to be recharged at regular intervals. Existing wireless recharging systems offer potential advantages (such as greater convenience) relative to more-conventional systems that require the mobile products to be plugged into an electrical outlet with a power cord. However, wireless charging systems could benefit from additional improvements related to cost and size reduction. Further, recent advances in wireless charging systems allow for some devices to serve both as power transmitters and power receivers, allowing charge sharing among devices. Such bidirectional wireless charging systems are described in more detail at http://www.engadget.com/2013/01/07/fulton-innovation-launches-ecoupled-technology-for-bi-directiona/, the content of which is incorporated herein in its entirety by reference. Thus, compact implementations of wireless charging systems that can also cost-effectively support devices that work as both charging source and charging sink are desirable.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION OF THE INVENTION

Figure 1:
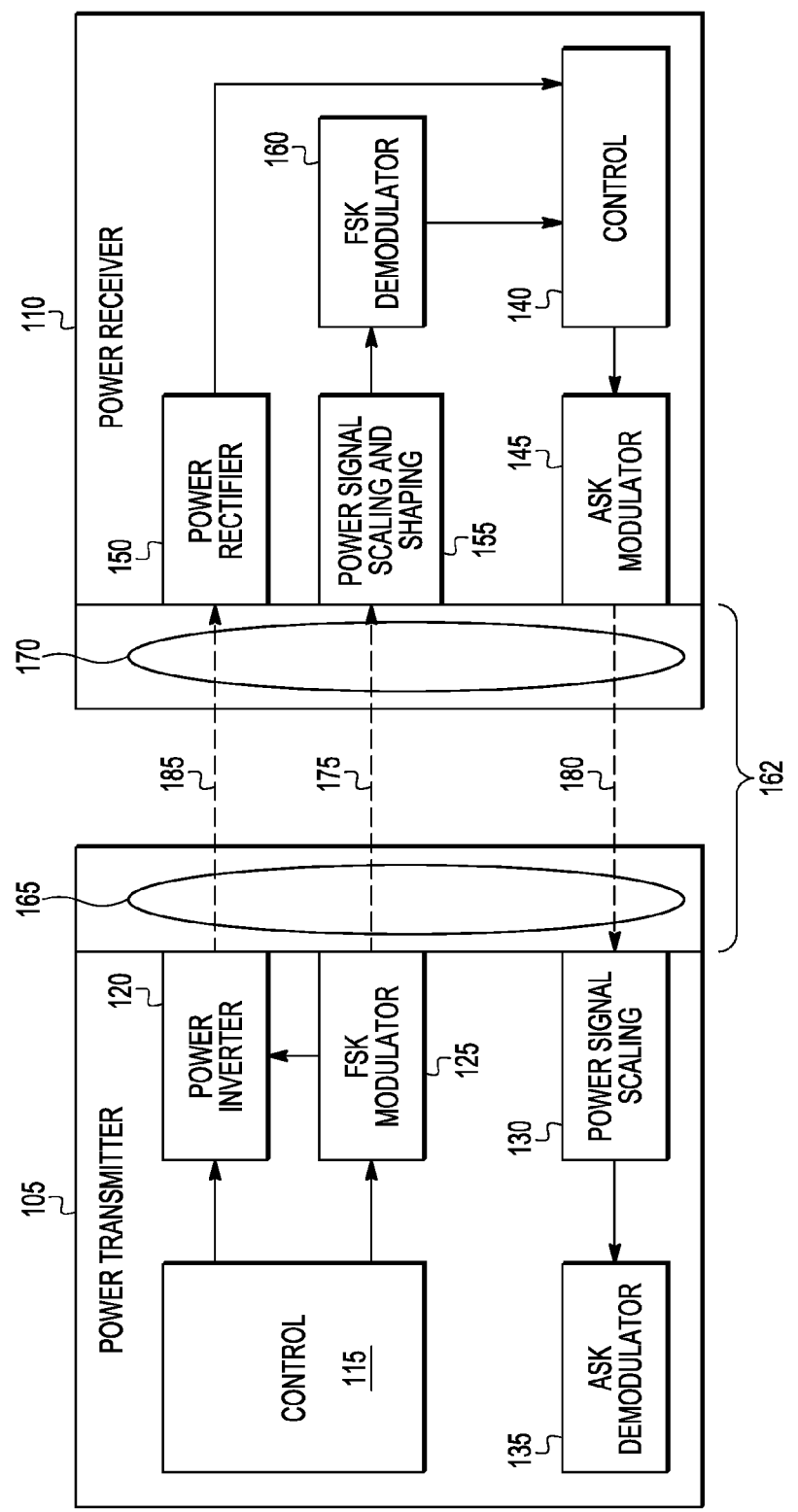
FIG. 1 is a schematic block diagram illustrating a wireless power transmission system according to an embodiment of the present invention.

Detailed illustrative embodiments of the present invention are disclosed herein. However, specific structural and functional details disclosed herein are merely representative for purposes of describing example embodiments of the present invention. The present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention provides a method implemented in a wireless charging system including a power transmitter and a power receiver, where a primary coil in the power transmitter wirelessly transmits a power signal to a secondary coil in the power receiver, wherein one of the power transmitter and the power receiver is used for recovering binary data modulated onto the power signal using a bi-phase digital encoding scheme. The method includes (a) processing an analog voltage signal in a first coil of the wireless charging system using analog circuitry to generate a processed analog signal, wherein the first coil is one of the primary coil and the secondary coil, (b) sampling the processed analog signal to generate a sequence of digital samples, (c) detecting transitions in the sequence of digital samples associated with the bi-phase digital encoding scheme by applying two or more different transition-detection filters to the sequence of digital samples, and (d) decoding the detected transitions to recover the binary data.

In one embodiment, the present invention is a method implemented in a wireless charging system including a power transmitter and a power receiver, where a primary coil in the power transmitter wirelessly transmits a power signal to a secondary coil in the power receiver, wherein one of the power transmitter and the power receiver is used for recovering binary data modulated onto the power signal using a bi-phase digital encoding scheme. The method includes (a) processing an analog signal corresponding to voltage in a first coil of the wireless charging system using analog circuitry to generate a processed analog signal, wherein the first coil is one of the primary coil and the secondary coil, (b) sampling the processed analog signal to generate a sequence of digital samples, (c) detecting transitions in the sequence of digital samples associated with the bi-phase digital encoding scheme by applying two or more different transition-detection filters to the sequence of digital samples, and (d) decoding the detected transitions to recover the binary data, where steps (c) and (d) are implemented in a micro-controller unit (MCU) of a node in the wireless charging system that can function in either a power transmitter mode or a power receiver mode. When the node functions in the power transmitter mode, (i) the power signal is an ASK-modulated power signal and (ii) the MCU implements steps (c) and (d) to recover the binary data from the ASK-modulated power signal, and when the node functions in the power receiver mode, (i) the power signal is an FSK-modulated power signal and (ii) the MCU implements steps (c) and (d) to recover the binary data from the FSK-modulated power signal.

In one embodiment, the present invention is a power transmitter in a wireless charging system including a power transmitter and a power receiver, where a primary coil in the power transmitter wirelessly transmits a power signal to a secondary coil in the power receiver, and one of the power transmitter and the power receiver implements a method to recover binary data modulated onto the power signal using a bi-phase digital encoding scheme. The method includes (a) processing an analog signal corresponding to voltage in a first coil of the wireless charging system using analog circuitry to generate a processed analog signal, wherein the first coil is one of the primary coil and the secondary coil, (b) sampling the processed analog signal to generate a sequence of digital samples, (c) detecting transitions in the sequence of digital samples associated with the bi-phase digital encoding scheme by applying two or more different transition-detection filters to the sequence of digital samples, and (d) decoding the detected transitions to recover the binary data.

In another embodiment, the present invention is a power receiver in a wireless charging system including a power transmitter and a power receiver, where a primary coil in the power transmitter wirelessly transmits a power signal to a secondary coil in the power receiver, and one of the power transmitter and the power receiver implements a method to recover binary data modulated onto the power signal using a bi-phase digital encoding scheme. The method includes (a) processing an analog signal corresponding to voltage in a first coil of the wireless charging system using analog circuitry to generate a processed analog signal, wherein the first coil is one of the primary coil and the secondary coil, (b) sampling the processed analog signal to generate a sequence of digital samples, (c) detecting transitions in the sequence of digital samples associated with the bi-phase digital encoding scheme by applying two or more different transition-detection filters to the sequence of digital samples, and (d) decoding the detected transitions to recover the binary data.

One of the largest wireless charging consortia is the Wireless Power Consortium (WPC), which has developed a wireless charging standard called Qi. The Qi standard defines the types of inductive power coupling and the control communications protocols to be used for low-power wireless device charging. The Qi standard creates interoperability between the power transmitter and the power receiver. More details on the Qi Standard can be found in "System Description Qi Wireless Power Transfer, Volume II: Medium Power," Version 0.9, Wireless Power Consortium, January 2015 (herein "the Qi standard") the contents of which are incorporated herein by reference in their entirety.

The Qi standard uses a coil-to-coil coupling interface for power transfer from a primary coil in a transmitter to a secondary coil in a receiver. A key characteristic of the Qi standard is the facilitation of control communications signaling over the same coil-to-coil interface that provides the power transmission.

Presently, Qi-compliant wireless devices use amplitude-shift keying (ASK) modulation to facilitate one-way control communication from the power receiver to the power transmitter. On a physical level, control communications from the power receiver to the power transmitter proceeds using load modulation. This means that the power receiver switches the amount of power that it draws from the power transmitter between two discrete levels (note that these levels are not fixed, but depend on the amount of power that is being transferred). The actual load modulation method is left as a design choice for the power receiver. Resistive and capacitive schemes are possible. The load modulation ASK method is called backscatter ASK modulation.

Recently, the WPC Qi group has been working on a medium-power standard that additionally facilitates one-way control communication from the power transmitter to the power receiver using frequency-shift keying (FSK) modulation.

On a physical level, communication from the power transmitter to power receiver is accomplished using FSK modulation. This means that the power transmitter changes the frequency at which it is providing power to the power receiver between two discrete frequencies (note that these frequencies are not fixed, but depend on the operating frequency at the time the message is sent).

In either case, on a logical level, the communications protocols utilize a sequence of short messages that contain the relevant data to be sent. These messages are contained in packets, which are transmitted in a simple serial digital framing format that includes a preamble.

Both ASK and FSK modulation can be executed concurrently to achieve bidirectional communication between power transmitter and receiver; however, in most cases, ASK and FSK are used alternately because of the send and respond nature of the communication between the receiver and transmitter.

FIG. 1 is a schematic block diagram illustrating a wireless power transmission system 100 according to an embodiment of the present invention.

The wireless power transmission system 100 includes a power transmitter 105 and a power receiver 110. The power transmitter 105 and the power receiver 110 are coupled inductively via a coil-to-coil interface 162 that includes a transmitter/primary coil 165 and a receiver/secondary coil 170.

In practice, the transmitter coil 165 and the receiver coil 170 are housed physically within the enclosures of the power transmitter 105 and the power receiver 110, respectively. For example, the power transmitter 105 may be inside a charging pad apparatus designed for placement on a desktop, and the power receiver 110 may be embedded within a smartphone or tablet. In operation, the devices housing the coils 165/170 are placed next to each other and arranged so that the transmitter coil 165 and the receiver coil 170 are generally in close proximity and lined up/oriented to maximize power and communication signal transfer between the devices.

The coil-to-coil interface 162 carries a frequency- and amplitude-modulated composite signal from the receiver 110 to the transmitter 105, where the composite signal is represented in FIG. 1 by a power signal 185 representing power transmitted from the transmitter 105 to the receiver 110, an FSK signal 175 representing data communicated from the transmitter 105 to the receiver 110, and an ASK signal 180 representing data transmitted from the receiver 110 to the transmitter 105. The composite signal is the result of modulating the frequency of the power signal 185 based on the FSK signal 175 and modulating the amplitude of the power signal 185 using backscatter modulation based on the ASK signal 180. It should be understood that (i) there are no ohmic electrical connections between the power transmitter 105 and the power receiver 110 and that (ii) the arrows representing the FSK signal 175, the ASK signal 180, and the power signal 185 in FIG. 1 are provided simply for ease of illustration of origin and termination points for those wireless signals, which are all wirelessly transmitted through the coil-to-coil interface 162.

The power transmitter 105 includes a transmitter control circuit 115 that controls a power inverter circuit 120 and an FSK modulator circuit 125. The power transmitter 105 also includes a power signal scaling circuit 130 and an ASK demodulator circuit 135.

The power receiver 110 includes a control circuit 140, an ASK modulator circuit 145, and a power rectifier circuit 150. The power rectifier circuit 150 supplies a rectified voltage to the control circuit 140, which in turn controls the ASK modulator circuit 145. The power receiver 110 also includes a power signal scaling and shaping circuit 155 and an FSK demodulator circuit 160.

The power transmitter 105 is typically plugged into an electrical outlet at a fixed location and includes (internally or externally) an AC-to-DC converter/rectifier (not shown) that provides internal DC power for operation of the power transmitter 105 from an AC outlet. Alternatively or additionally, the power transmitter 105 may include an internal DC voltage source such as a large storage battery. In either case, the power inverter circuit 120 serves to invert the DC source to AC at an appropriate frequency for transmission over the coil-to-coil interface 162 under the control of the power transmitter control circuit 115.

The power receiver 110 includes the power rectifier circuit 150, which receives the power signal 185 transmitted via the coil-to-coil interface 162 and converts the received AC voltage back to DC for use in the power receiver 110 and for powering a load (not shown) such as a battery in a cellular/smart phone or tablet.

The power transmitter 105 also includes the FSK modulator circuit 125, which receives status/control data from the control circuit 115, modulates the data using FSK modulation, and transmits the FSK signal 175 in combination with the power signal 185 across the coil-to-coil interface 162 by modulating the frequency of the power signal 185 based on the FSK signal 175.

The power signal scaling and shaping circuit 155 extracts, scales, and shapes the FSK signal 175 from the secondary coil 170 and passes the recovered FSK signal to the FSK demodulator circuit 160, which demodulates the recovered FSK signal and passes the demodulated data to the power receiver control circuit 140.

Within the power receiver 110, the control circuit 140 sends receiver status/control information to the ASK modulator circuit 145 where the receiver status/control information is transmitted via ASK modulation of the power signal 185 (illustrated as the ASK signal 180) to the power signal scaling circuit 130, which extracts and scales the ASK signal 180 from the primary coil 165 and passes the recovered ASK signal to the ASK demodulator circuit 135, which demodulates the recovered ASK signal and passes the demodulated data to the control circuit 115 of the power transmitter 105.

ASK is a relatively simple modulation scheme. In ASK modulation, the frequency and phase of the power signal carrier are kept constant, and the amplitude is varied. Information bits are communicated via changes in the power signal carrier's amplitude. ASK is also sometimes referred to as 2ASK because the modulation signal can take only two logical levels: 0 or 1.

The power receiver 110 communicates to the power transmitter 105 using backscatter ASK modulation. For this purpose, the power receiver 110 (and more specifically the ASK modulator circuit 145) modulates the amount of power drawn from the received power signal between two levels representing a logical 1 and a logical 0. The ASK demodulator circuit 135 in the power transmitter 105 detects the ASK signal 180 as a modulation of the current through and/or voltage across the primary coil 165.

The power transmitter 105 communicates to the power receiver 110 using FSK modulation. For this purpose, the FSK modulator circuit 125 in the power transmitter 105 modulates the frequency of the power signal 185 and this frequency change is detected by the FSK demodulator circuit 160 in the receiver 110.

Figure 2A:
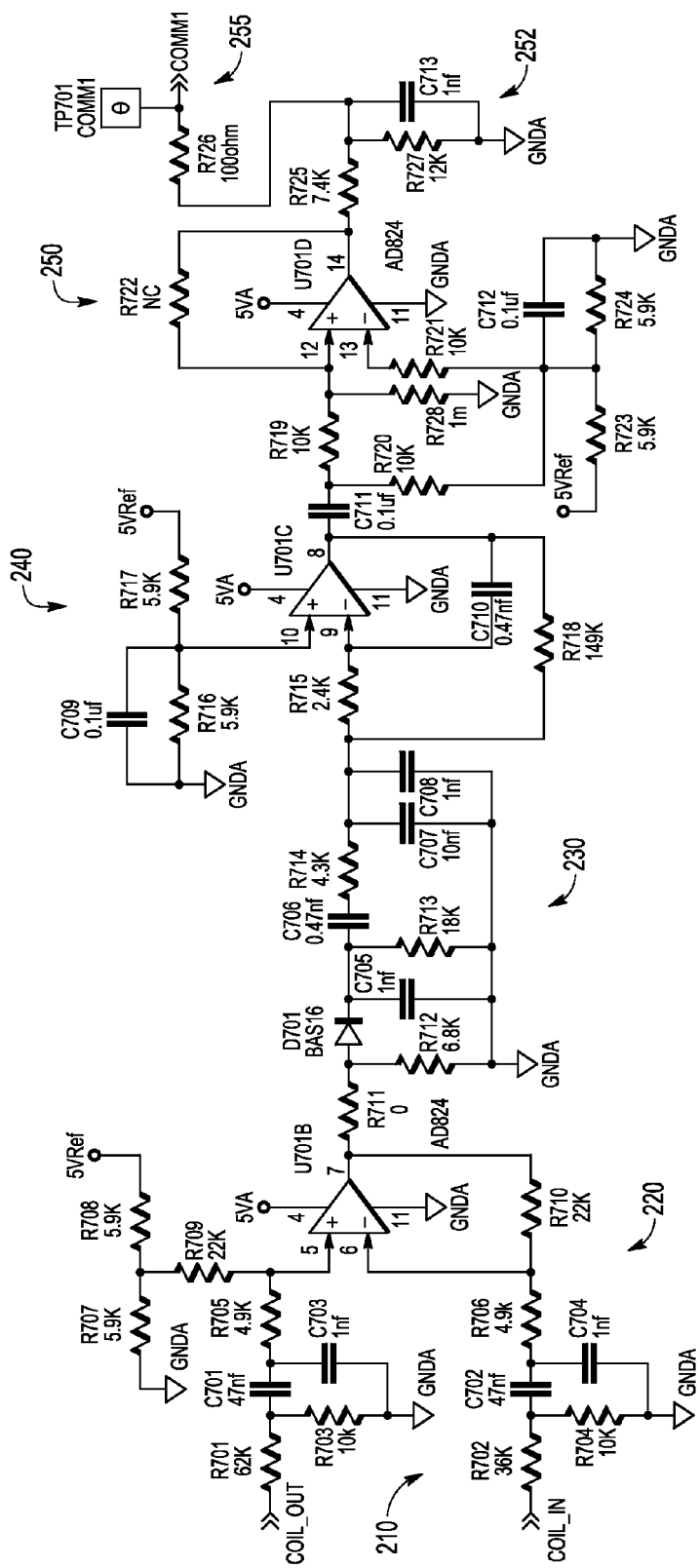
FIGS. 2A and 2B are schematic circuit diagrams respectively illustrating (a) a conventional demodulator circuit for amplitude-shift keying (ASK) and (b) a conventional demodulator circuit for frequency-shift keying (FSK)
Figure 2B:
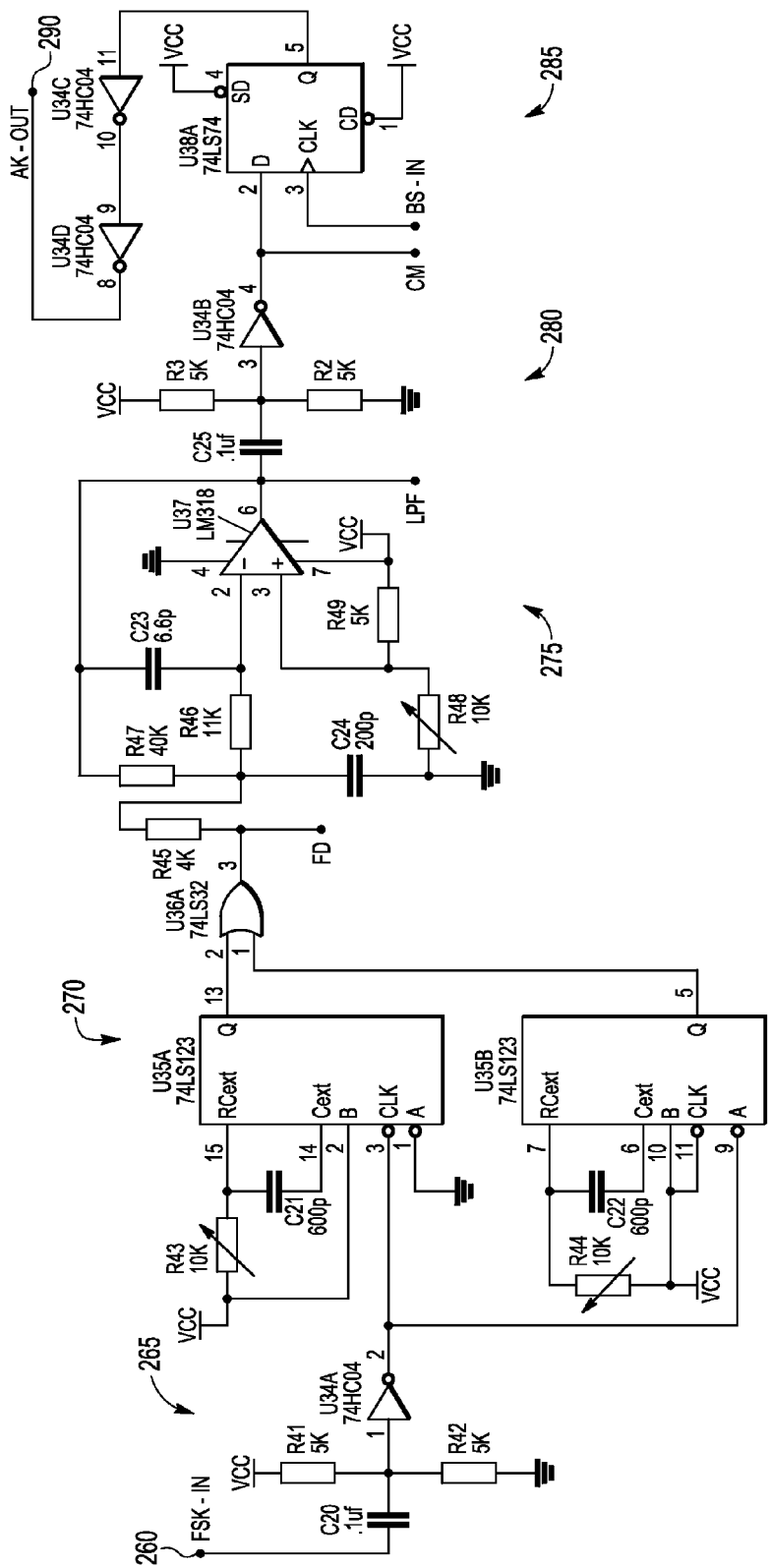

FIGS. 2A and 2B are schematic circuit diagrams respectively illustrating (a) a conventional ASK demodulator circuit 200A as might be found in a conventional power transmitter, and (b) a conventional FSK demodulator circuit 200B, as might be found in a conventional power receiver.

In the cost-sensitive context of wireless-charging systems, the numerous discrete components utilized, including logic gates and operational amplifiers, represent particularly costly implementations of these circuits 200A and 200B.

The ASK demodulator circuit 200A includes secondary coil input and output taps 210, a voltage scale down circuit 220, a rectification and DC filter circuit 230, a low-pass filter circuit 240, a level comparator circuit 250, a voltage divider 252, and a communications output 255.

Details of operation of ASK demodulation using the ASK demodulator circuit 200A in combination with a microcontroller can be found in Freescale Semiconductor's Application Note AN4701, "Demodulating Communication Signals of a Qi-Compliant Low-Power Wireless Charger Using MC56F8006 DSC," Rev. 0, March 2013 (herein "AN4701"), the contents of which are incorporated herein by reference in their entirety.

The FSK demodulator circuit 200B includes a first shaping circuit 265, a pulse trigger circuit 270, a second-order band pass filter 275, a second shaping circuit 280, and a clock synchronizer circuit 285.

In operation, the first shaping circuit 265 receives an FSK-modulated input 260 from a scale down circuit (not shown) associated with the receive coil (not shown) of a power receiver (not shown). The first shaping circuit 265 shapes the scaled sinusoidal wave FSK-modulated input 260 into a rectangular wave signal by effectively clamping or limiting the low and high excursions of the sine wave to specific limits, thereby squaring off the peaks and valleys.

The pulse trigger circuit 270 then outputs a pulse associated with each rising edge and each falling edge of the rectangular wave signal output from the first shaping circuit 265, resulting in a pulse train which tracks the frequency modulation of the original FSK-modulated input 260. This varying-frequency pulse train is then fed into the second-order band pass filter 275, where the higher frequency associated with a modulated logical 1 passes with more amplitude than the lower frequency associated with a modulated logical 0. The output of the band pass filter 275 is thresholded by the second shaping circuit 280 into a binary signal that is then synchronized to the system clock to recover an accurate representation of the original digital data. While this circuit is effective, it can suffer from false negative and false positive detections of bits based on glitches in the recovered signal due to noise and marginal modulations.

Figure 3:
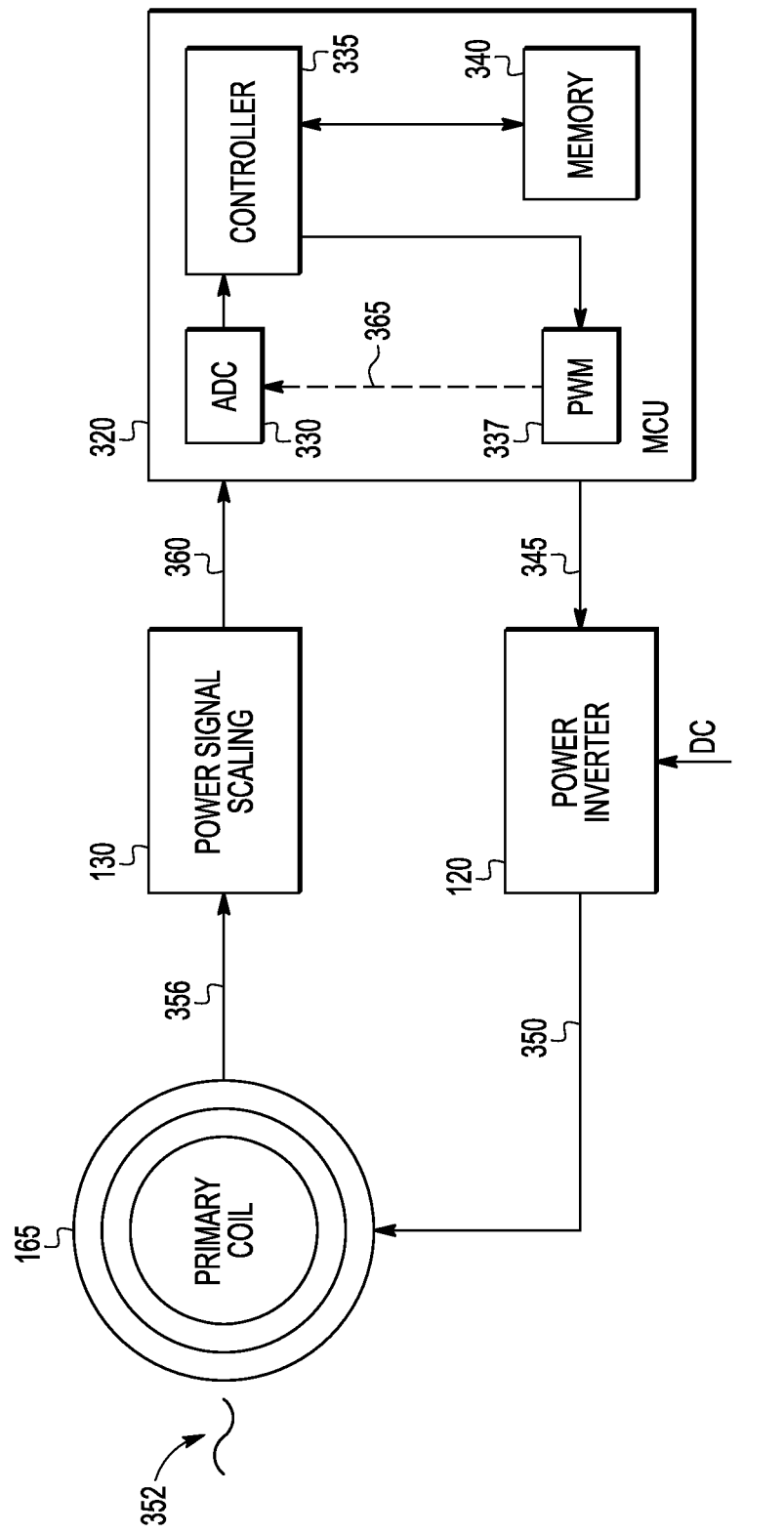
FIG. 3 is a schematic block diagram illustrating a power transmitter of the system shown in FIG. 1.

FIG. 3 is a schematic block diagram illustrating the operations in the power transmitter 105 of FIG. 1 involved the recovery and demodulation of the ASK signal 180. In particular, FIG. 3 shows the primary coil 165, the power signal scaling circuit 130, the power inverter 120, and a micro-controller unit (MCU) 320 that implements the controller 115 and the ASK demodulator 135 of FIG. 1.

The MCU 320 includes an analog-to-digital converter (ADC) 330, a controller 335, a multi-channel pulse width modulator (PWM) 337, and a memory 340, along with timers, general purpose IO, UARTs, and other supporting functions and peripherals (not illustrated).

In operation, the controller 335 instructs the PWM 337 to output signals 345 that control the operation of the power inverter 120 to effect a conversion of its DC input into a square-wave power output 350 that, when driven through the effective inductance of the primary coil 165, results in a sinusoidal power signal. The power output 350 has a frequency of approximately 100 kHz to 205 kHz in accordance with the Qi Standard. The primary coil 165 radiates the wireless signal 352 to the secondary coil 170 of the power receiver 110 of FIG. 1. Note that, while the power inverter 120 is not technically involved in the ASK demodulation process, it is responsible for the generation of the power output 350 that results in the wireless signal 352 received by the secondary coil 170 of the receiver 110 upon which the ASK modulation is ultimately impressed. It is therefore instructive to describe the operation of the power inverter 120 in the demodulation context.

There are many different power inverter circuits that may be employed to implement the power inverter 120. One implementation is described in section 3.1 of Freescale Semiconductor's Application Note AN4705, "Low-Power Wireless Charger Transmitter Design Using MC56F8006 DSC," Rev. 0, March 2013 (herein "AN4705"), the contents of which are incorporated herein by reference in their entirety.

Further, describing the role the PWM 337 plays in both (a) generation of the power signal 350 via the power inverter 120 and (b) sampling of the modulated power signal 360 during demodulation, is helpful to understanding the dual utility of the PWM 337 according to this embodiment of the invention.

The power receiver 110 modulates the wireless signal 352 with backscatter ASK modulation in conformance with the Qi Standard. The backscatter ASK modulation changes the amplitude of the sinusoidal wave in the transmitting primary coil 165 by drawing current in the secondary coil 170, thereby encoding data onto the wireless signal 352 according to a bi-phase digital encoding scheme called out in the Qi Standard.

Bi-phase encoding is a method of encoding logical ones and zeros, where a logical zero is characterized by no transition in the middle of a bit period, while a logical one is characterized by either a low-to-high transition or a high-to-low transition near the middle of the bit period. The bit rate of the digital backscatter ASK modulation is 2 kbps+/−4%. More details on the ASK encoding scheme can be found in AN4701.

The backscatter ASK modulation performed in the power receiver 110 results in a deviation between highs and lows in the amplitude of the voltage signal in the primary coil 165 of not less than 250 mV.

The voltage signal in the primary coil 165 is received via input 355 by the power signal scaling circuit 130, where the voltage signal is scaled down to a voltage in a range that is within the scale acceptable to the ADC 330 of the MCU 320 (e.g., 0 to 5 volts). The ADC 330 receives the scaled voltage signal 360 representative of the primary coil voltage signal that carries the ASK modulation. The sampling of the ADC 330 is controlled by an output 365 (e.g., a synchronized output) of the PWM 337. The PWM 337 is calibrated to periodically sample the scaled primary coil voltage signal at or very close to its peak value every cycle of the power signal. The periodic sampling frequency can be locked to the frequency of the primary coil power signal (e.g., 107 kHz).

In some embodiments, e.g., for high-frequency primary coil power signals, to enable the use of slower ADCs, the PWM 337 can be programmed to sample the peaks of the power signal every $n^{th}$ cycle of the power signal (e.g., n=2, 3, 4, . . . ).

The outputs of the ADC 330 are captured by the controller 335 and processed by one or more filtering algorithms executed by the controller 335 to determine when a transition in the signal has most likely occurred corresponding to the transmission of a logical 1 or 0 according to the bi-phase encoding scheme. The controller 335 communicates with the memory 340 to store and retrieve both intermediate values associated with the filtering algorithms as well as final decoded bit values associated with the ASK modulated data signal 180 from the receiver 110.

Figure 4:
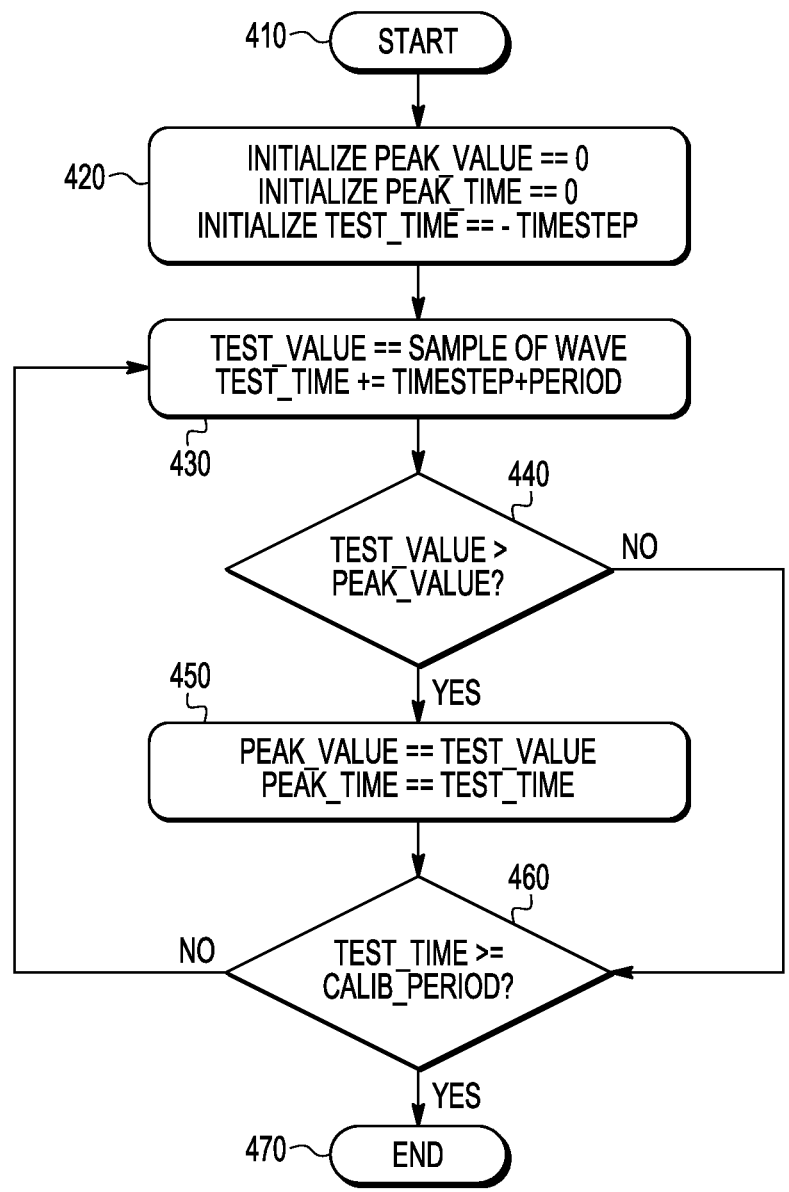
FIG. 4 is a top-level flow chart of a process for calibrating a pulse width modulator to periodically sample a wireless power signal in accordance with an embodiment of the present invention.

FIG. 4 is a flow chart of a calibration process 400 for calibrating the PWM 337 of FIG. 3 to enable the ADC 330 to periodically sample the scaled voltage signal 360 (also referred to herein as the power signal 360) substantially at its peak value using a trigger point sweeping strategy. The process starts in step 410, triggered by a start signal corresponding to the beginning of the sinusoidal power signal cycle or period. This start signal can be a component of the PWM output signals 345 corresponding to the control for one of the four legs of a full-bridge inverter that is used to implement the power inverter 120 (for more details, see AN4705). In an alternative embodiment, the start signal might be another signal that is associated with the cycle timing of the power signal (e.g., the output of a low-to-high zero-crossing detector associated with the power signal).

In step 420, the controller 335 initializes in the memory 340 (i) a Peak_Value variable and a Peak_Time variable to 0 and (ii) a Test_Time variable to TimeStep so that, when Test_Time is later incremented for the first time in step 430, Test_Time will equal a time of 0 relative to the beginning of the following power signal cycle.

In step 430, the ADC 330 samples the power signal 360, and the controller 335 (i) stores the sample as a Test_Value variable in the memory 340 and (ii) increments the Test_Time variable by the TimeStep value plus a full cycle delay (Period, i.e., the duration of one complete power signal cycle). The TimeStep value is a constant set to correspond to a time increment that is typically equal to about $1/10^{th}$ or $1/20^{th}$ of the power signal period so that a sufficiently fine resolution of sampling can be done on the power signal 360.

Note that, as indicated by the addition of the constant value Period to the Test_Time value, each subsequent sample is taken at a time that is one complete power signal cycle plus an increment of TimeStep later. This is done this way to avoid the need to use a very fast ADC to determine the time of occurrence of the peak value of the power signal. Rather than step by TimeStep across a single cycle, the ADC 330 samples the power signal 360 TimeStep deeper into each successive cycle. Assuming low jitter on the power signal 360, this technique achieves the same result as sampling multiple times across a single cycle but allows operation with a much slower ADC. In particular, during calibration, the ADC sampling rate will be slightly lower than the normal operating frequency of the ADC 330.

Note that, in some embodiments, TimeStep may be subtracted instead of added, such that each subsequent sample could be taken at a time that is one full Period less one TimeStep later and thus the sampling frequency may be slightly higher than the power signal frequency.

In step 440, a test is performed to see whether Test_Value is greater than Peak_Value. If not, then processing continues to step 460, which is described further below.

If Test_Value is greater than Peak_Value as determined by the test of step 440, then, in step 450, the Peak_Value is updated with the larger value of Test_Value, and Peak_Time is updated with the value of Test_Time.

In step 460, a test is performed to see if the calibration process is complete. In particular, a test is performed to determine whether the end of the calibration period has been reached by comparing Test_Time to a specified Calib_Period value. For example, Calib_Period may be a constant for the system that is set to P times the cycle time of the power signal 360, where P is the number of TimeStep duration samples into which the cycle is divided. If the TimeStep value is set to ⅒ of the power signal period, then, P=10, and for the Qi Standard example, Calib_Period may be set to 1/107 kHz or 9.3 usec×10=93 usec. In this case, the test would be performed for 10 cycles of the power signal 360. Alternatively, the actual sampling may be restricted to only the positive phases of the power signal cycle to reduce the possibility of false peak detection in phases of the power signal 360 where the peak is known not to occur. This technique is used in some embodiments to further reduce the sampling rate (e.g., by a factor of 2) during calibration and/or operation. Additionally, in some embodiments, during calibration and/or operation, sampling the peak values need not be done every cycle of the power signal, but might alternatively be performed every other, every third, every fourth, or every $k^{th}$ cycle, as long as a sufficient number of samples is taken per each bit period to resolve the transition information of the bit encoding scheme.

If the test of step 460 determines that the calibration process is not complete, then the process continues with the acquisition of a new sample of the power signal 360 in step 430. If the test of step 460 determines that the calibration process is complete, then the calibration process ends in step 470.

Note that the calibration process 400 may be repeated several times to determine a more reliable value for the time offset into the cycle of the power signal 360 where the peak value occurs, assuming that the same exact offset is not yielded by the calibration process each time. In some cases, an average time offset value might be used instead to overcome jitter in the peak timing calibration.

In some embodiments, an additional timing algorithm may be used to find a value for the time offset into the cycle where the peak value of the power signal 360 occurs. Such additional timing algorithm may, for example, discard samples outside of a region in which the peak value is expected, to eliminate false positives.

In some embodiments, the calibration sequence for this offset determination may be repeated periodically during operation or as needed to determine a "best" offset value, e.g., via an averaging process, that may optionally include the discarding of any outlying offset values. Once a good offset value is determined, the output signal 365 of the PWM 337 is programmed with this offset value to be used to trigger the ADC 330 during normal operation. During normal operation, for each cycle of the power signal 360, the PWM output signal 365 is used to trigger the ADC 330 to sample the power signal 360 at its peak for use in an averaging algorithm as part of the ASK signal demodulation of FIG. 3.

In some embodiments, following calibration and during operation, if a sampled peak value is too far out of range of what would be expected to be a valid low or high peak value, the sampled peak value may be discarded and/or either the preceding or following valid peak value may be used in its place. This discarding process may be used operationally as an effective first filtering algorithm (potentially in combination with other techniques) in the demodulation of the ASK signal.

In some embodiments, if too many peak values are detected out of a valid range, then the calibration process 400 may be rerun to make sure that the system is sampling the power signal 360 at its true peak.

Figure 5:
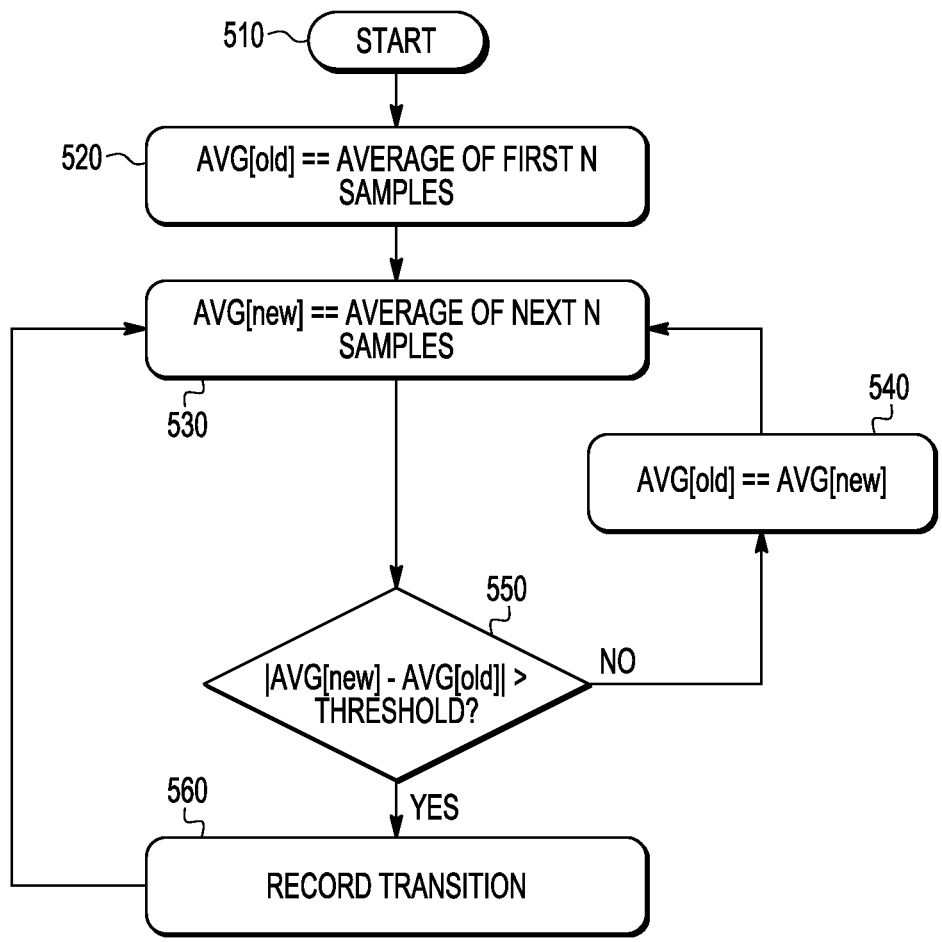
FIG. 5 is a flow chart of a filtering algorithm according to an embodiment of the present invention.

FIG. 5 is a flow chart of a second filtering algorithm 500 according to an embodiment of the present invention. The algorithm begins in step 510. In step 520, N samples of the power signal 360 are captured, and the average of the N samples is stored in the variable AVG[old]. Next, in step 530, the next N samples are captured, and the average is stored in the variable AVG[new].

In test 550, the absolute value of the difference between AVG[new] and AVG[old] is calculated and compared to a specified transition threshold. The transition threshold is typically set to about 200 mV corresponding to the expected difference in amplitude between a low and a high in the backscatter ASK modulation scheme in Qi Standard-compliant systems. If the difference is greater than the threshold, then a transition is recorded in step 560, and the time of the transition is used in the decoding of the bi-phase encoding used in the ASK modulation. If the difference is not greater than the threshold, then, in step 540, the value stored in AVG[new] is copied to the variable AVG[old], and the process continues in step 530. The algorithm continues until a transition is detected in step 550 or the process is otherwise interrupted.

Figure 6:
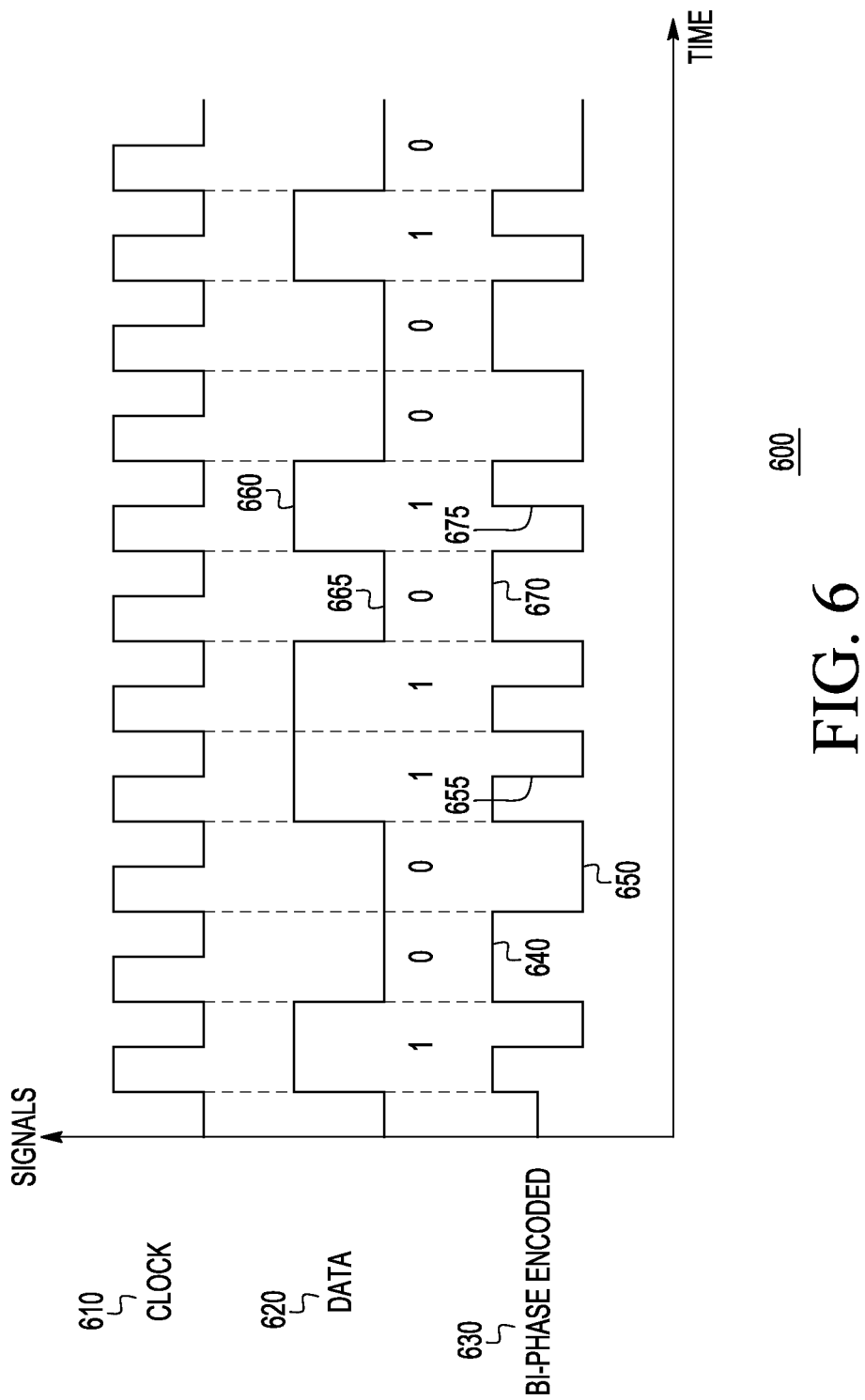
FIG. 6 is a timing diagram showing the relationship between a data clock, digital data, and bi-phase encoded data.

FIG. 6 is a timing diagram 600 showing the relationship between a data clock 610, a digital data signal 620, and a bi-phase encoded data signal 630. Note that, in a bi-phase encoding scheme, a zero is encoded by the lack of any transition in the middle of a bit period. Thus, it may correspond to a high-level amplitude modulation (e.g., 640) or a low-level amplitude modulation of the power signal (e.g., 650). It is the absence or presence of a transition that allows the ASK demodulator 135 to determine whether a bit is a zero or not.

Further, if a logical 0 is encoded by the lack of transition in the middle of a bit period having a low-level amplitude (e.g., at 650 of FIG. 6), then the one or more next logical 1 values are encoded by high-to-low transitions in the middle of their bit periods (e.g., at 655). Thus, a detected low-to-high transition following such a logical 0 can be discarded as an invalid state. Similarly, a logical 1 (e.g., at 660) following a logical 0 (e.g., at 665) that is encoded as a high level (e.g., at 670), will be encoded by a low-to-high transition (e.g., at 675). Thus, a high-to-low transition detected near the middle of that bit period can be discarded as invalid. Ignoring these invalid transitions can be considered a third filtering algorithm that can be applied in the demodulation process.

A fourth filtering algorithm that may be applied to ADC samples of the power signal 360 that is particularly effective at determining transitions that occur in bi-phase encoded modulation is a sliding window weighted average, represented by the following exemplary algorithm:

DATA_AVG(*i*)=*K*×DATA_AVG(*i*−1)+(1−*k*K)×DATA_NEW, where K is an adjustable coefficient value (typically set to about 0.9) that gives a higher weight to the running average than to new samples. In practice, this fourth filter will track the data rather slowly depending on the number of samples in a bit period and the value of K. This can be useful in smoothing out any noise spikes from the data and allowing a clean determination of the occurrence of a transition in the data.

This fourth filtering algorithm is combined with at least the second filtering algorithm of FIG. 5 according to various embodiments of the present invention. Note that the second filtering algorithm, for small chosen values of N, can be considered to track changes in the power signal 360 fairly closely, while the fourth filtering algorithm can be seen to track changes in the power signal 360 more slowly or similarly with a greater lag.

Thus, when the power signal 360 transitions from a high level to a low level, the second filter result should be observed to be lower than the fourth filter result immediately following a valid transition in the power signal 360 since the fourth filter result will lag (i.e., overshoot a drop in) the power signal 360, while the faster/tighter-tracking second filter result will stay closer to the actual falling value of the power signal 360. These facts can be used in a combined filtering algorithm by limiting the tests to just before and just after the expected time of transition and using information from both filters on both sides of the expected transition time to eliminate glitches from triggering a false positive or a false negative on transition detection.

In other words, the second and fourth filtering algorithms must agree (both just before the transition point and just after the transition point) that a transition of a particular direction has occurred, in a combined filtering approach.

Further, the direction of the transition determined from combining second and fourth filtering algorithms can be used in combination with the third filtering algorithm to further remove invalid states from being detected.

Finally in a fifth filtering algorithm, the timing of a detected transition can be used to determine its validity. Since valid transitions in bi-phase encoding may only occur substantially at the edges of the bit period for encoded logical 0s and substantially at the beginning and middle of the bit period for encoded 1 s, this information can be used to help the system ignore transitions that do not occur at the expected times.

In a preferred embodiment of the present invention, filtering algorithms 1-4 are combined to produce a demodulation/decoding technique with a very low probability of detection error.

In various embodiments, two or more of the above filtering algorithms may be combined and/or used in the decoding of ASK-modulated or FSK-modulated data.

Figure 7:
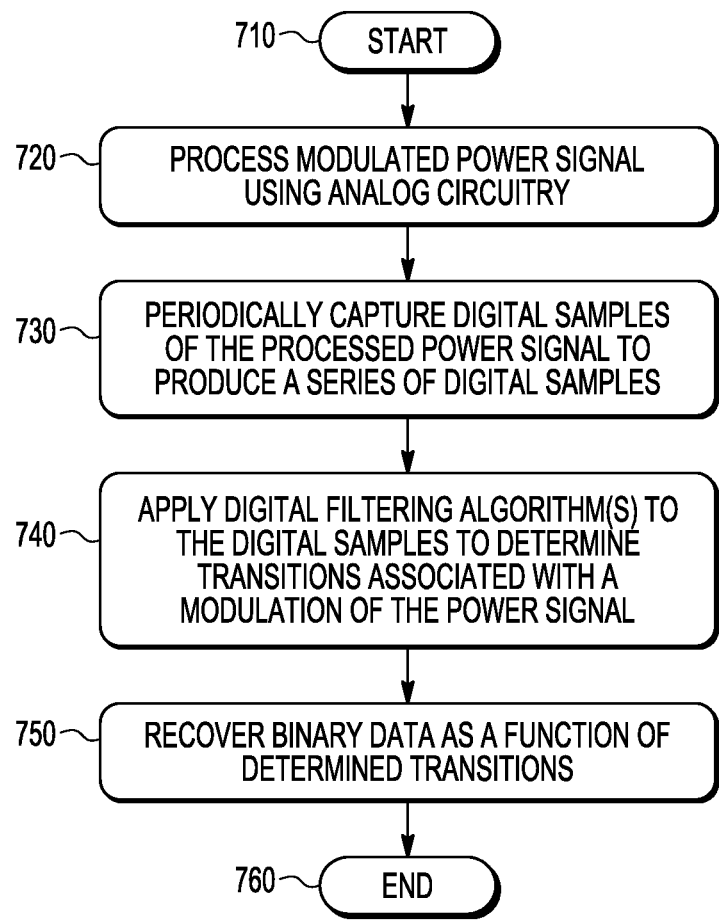
FIG. 7 is a flow chart of a demodulation procedure according to an embodiment of the present invention.

FIG. 7 is a flow chart of a demodulation procedure 700 according to an embodiment of the present invention. The process starts in step 710. In step 720, the power signal is first processed with analog circuitry (such as power signal scaling circuit 130 in the case of ASK demodulation).

In step 730, the power signal is periodically captured to produce a series of digital samples. For example, in the case of ASK demodulation, the ADC 330 of MCU 320 of FIG. 3 may be used to sample the output 360 of the power signal scaling circuit 130 that has been used to produce a scaled down representation of the power signal. This sampling will result in the capture of a series of digital samples with values that are representative of voltages typically between 0 and 5 volts.

In step 740, one or more digital filtering algorithms are applied to the series of digital samples to determine low-to-high and high-to-low transitions in the power signal modulation corresponding to the bi-phase encoding of binary data on the power signal during either ASK or FSK demodulation. For example, the previously described second and fourth filtering algorithms might be combined to process the digital samples to determine transitions in the power signal.

In step 750, the transition information is used to help determine the original binary data that was transmitted via the modulation of the power signal. If the process 700 is being run in a transmitter, then the process 700 will be used for demodulating an ASK-modulated data stream, and, if the process 700 is being run in a receiver, then it will be used for demodulating an FSK-modulated data stream.

Figure 8:
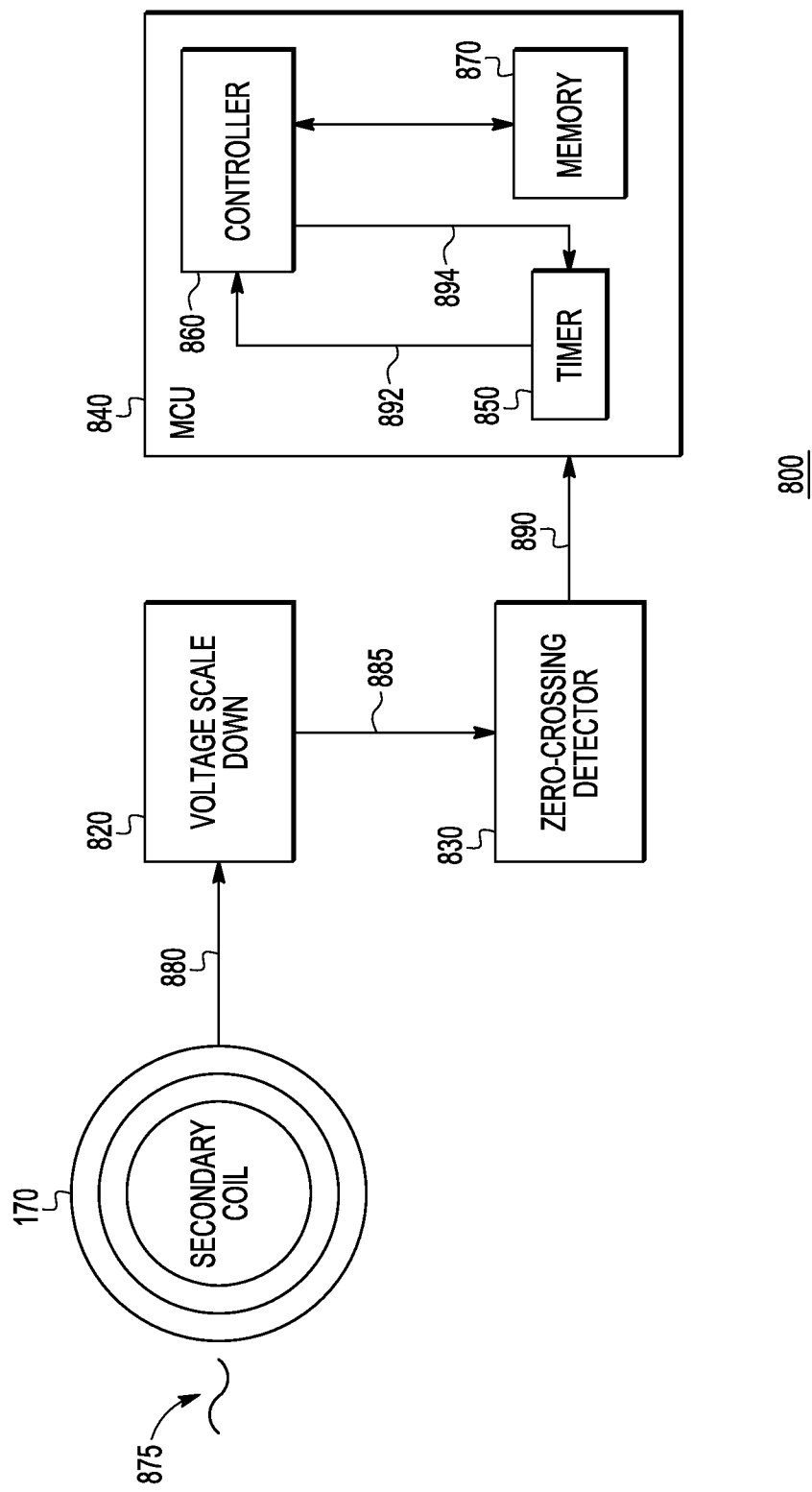
FIG. 8 is a schematic block diagram illustrating a power receiver of the system shown in FIG. 1.

FIG. 8 is a schematic block diagram illustrating the operations in the power receiver 110 of FIG. 1 involved in the recovery and demodulation of the FSK signal 175. In particular, FIG. 8 shows the secondary coil 170 of FIG. 1, a voltage scale down circuit 820, a zero-crossing detector 830, and an MCU 840 that implements the FSK demodulator circuit 160 and the controller 140 of FIG. 1. The voltage scale down circuit 820 and the zero-crossing detector 830 are part of the power signal scaling and shaping circuit 155 of FIG. 1.

The MCU 840 includes a timer 850, a controller 860, and a memory 870 along with counters, general-purpose IO, UARTs, ADCs, and other supporting functions and peripherals (not illustrated).

In operation, an FSK modulated wireless power signal 875 is received by the secondary coil 170 and the voltage is tapped off (880) and scaled down (e.g., to between 0 and 5V) by the voltage scale down circuit 820 and fed via connector 885 to the zero-crossing detector 830.

In the zero-crossing detector 830, the scaled-down power signal is shaped into a square wave signal whose rising and falling edges can be used as accurate indicators of the low-to-high transition times and high-to-low transition times, respectively, of the power signal.

The time between corresponding transitions, e.g., the time between successive low-to-high transitions of the output 890 (or alternatively the time between successive high-to-low transitions) can be measured to determine the period of the power signal (e.g., nominally 9.3 usec for a 107 kHz operating frequency of the power signal).

In this embodiment, each rising edge of the output 890 is fed into a trigger input of the timer 850, and the periods between rising edges (i.e., the instantaneous periods of the power signal) are captured as a series of digital samples.

Figure 9:
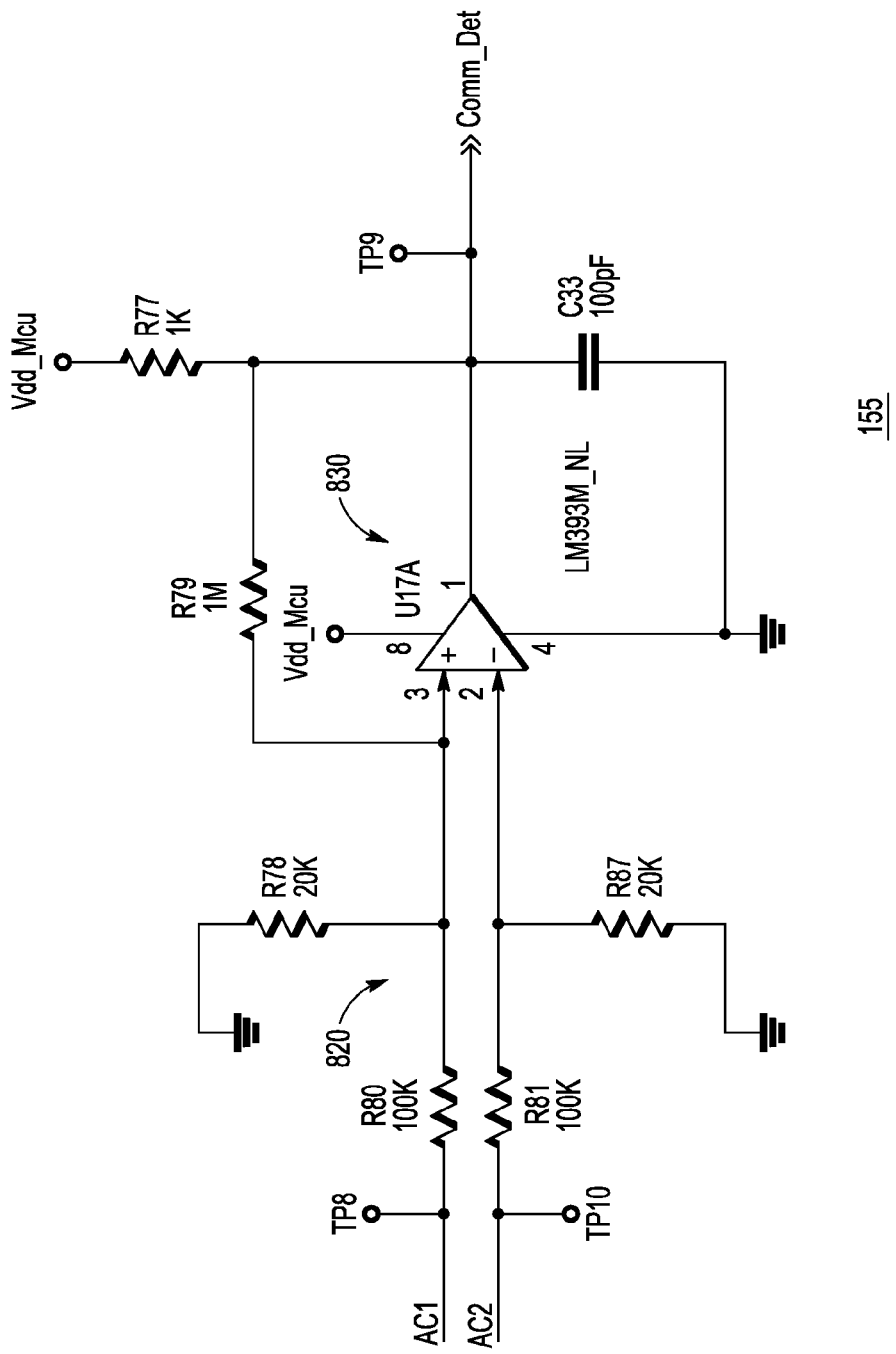
FIG. 9 is a schematic circuit diagram of an analog power signal scaling and shaping circuit of the system shown in FIG. 1 according to an embodiment of the present invention.

FIG. 9 is a schematic circuit diagram of the analog power signal scaling and shaping circuit 155 of FIG. 1 according to an embodiment of the present invention. The analog power signal scaling and shaping circuit 155 includes the voltage scale down circuit 820 of FIG. 8 and the zero-crossing detector 830 of FIG. 8.

In operation, the voltage scale down circuit 820 attaches to the secondary coil 170 of the power receiver 110 and scales down the power signal voltage (880) to a level (885) that is acceptable for use by the zero-crossing detector 830. The zero-crossing detector 830 receives the scaled-down power signal 885 and drives its output 890 high to the Vdd rail when it encounters a low-to-high zero crossing at its input, and drives its output 890 to ground when it encounters a high-to-low zero crossing at its input. This results in a scaled-down and squared-up representation 890 of the power signal of the secondary coil 170 that can be used directly as an input to the timer 850 of the MCU 840. By processing the secondary coil signals in this way, circuitry of the MCU (which MCU is generally necessary to support other control features of the receiver 110) can be utilized for the bulk of the FSK demodulation, providing both a reduction in external discrete analog circuitry for implementation of the FSK demodulation in addition to providing improved reliability and accuracy of detection by virtue of the filters implemented by the MCU. Overall, the discrete analog circuitry 155 of FIG. 9 associated with FSK demodulation has far fewer components than the corresponding conventional analog circuitry of FIG. 2B. Similarly, the discrete analog circuitry associated with ASK demodulation (i.e., the power signal scaling circuit 130 of FIGS. 1 and 3) has far fewer components than the corresponding conventional circuitry of FIG. 2A.

Note, after processing of an FSK-modulated power signal by the voltage scale down circuitry 820 and the zero-crossing detector 830, and using either the rising or falling edges of the signal 890 as input into the timer circuit 850, a series of data samples are developed. These data samples, which represent durations between consecutive rising zero crossings, have a format where high frequencies are represented by small value digital samples and low frequencies are represented by large value digital samples. This series of digital samples can thus be further processed with the same filtering algorithms (e.g., filtering algorithms 1-5) discussed previously (in the context of the ASK-demodulation examples) to remove glitches and minimize false positives and false negatives on transition detections in the modulation.

As discussed previously, the generic demodulation process 700 of FIG. 7 may be applied to FSK demodulation.

For example, in light of the embodiment of the invention according to the FSK demodulation of FIG. 8, after beginning the process in step 710, in step 720, the FSK-modulated wireless power signal 875 is received by the secondary coil 170 and then processed by analog circuitry such as the voltage scale down circuit 820 and the zero-crossing detector circuit 830.

In step 730, the power signal is periodically captured to produce a series of digital samples. In the case of FSK demodulation, within the MCU 840, digital samples are produced by the timer 850, which measures the period of time between consecutive rising edges of the output of the zero-crossing detector 830. These measured periods are captured by the controller 860 (e.g., via an interrupt service routine) and stored in the memory 870 as an array or series of digital samples (e.g., in a circular buffer).

In step 740, one or more digital filtering algorithms are applied to the series of digital samples to determine low-to-high and high-to-low transitions in the power signal modulation corresponding to the bi-phase encoding of binary data on the power signal during FSK demodulation.

The digital filtering algorithms, such as the 2nd and 4th digital filtering algorithms described earlier with respect to ASK demodulation, are applied by the controller 860 to the digital samples stored in the memory 870 to determine the occurrence of transitions in the power signal, and the results are stored back in the memory 870.

In step 750, the transition information is used to help determine the original binary data that was transmitted via the modulation of the power signal. If the process 700 is being run in the receiver 110, then it will be used for demodulating an FSK-modulated data stream. In this case, the controller 860 retrieves the transition information from the memory 870 and applies the transition rules associated with bi-phase encoding to the data to recover the originally transmitted binary data.

Thus, it should be clear that the top-level demodulation process 700 of FIG. 7 can be applied equally well to both FSK demodulation and ASK demodulation.

Note that some devices will be designed to support bi-directional power transfer. In these devices, the process 700 is of particular benefit since the process 700 can be used to demodulate both ASK-modulated signals (for transmitter mode) and FSK-modulated signals (for receiver mode) at considerable savings in cost and complexity.

Unless stated otherwise, terms such as "first," "second," and "third" are used to arbitrarily distinguish between the elements such terms describe. Thus, these terms are not necessarily intended to indicate temporal or other prioritization of such elements and are not to be interpreted as necessarily referencing similarly numbered elements in the embodiments of the specification. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. In a wireless charging system comprising a power transmitter and a power receiver, wherein a primary coil in the power transmitter wirelessly transmits a power signal to a secondary coil in the power receiver, a method implemented by one of the power transmitter and the power receiver for recovering binary data modulated on the power signal using a bi-phase digital encoding scheme, the method comprising:

(a) scaling an analog signal corresponding to voltage in a first coil of the wireless charging system using analog circuitry to generate a processed analog signal as a scaled-down waveform, wherein the first coil is one of the primary coil and the secondary coil;

(b) periodically sampling the processed analog signal at expected times of occurrences of voltage peaks in the scaled-down waveform using an analog-to-digital converter triggered by a pulse-width modulator to generate a sequence of digital samples;

(c) detecting transitions in the sequence of digital samples associated with the bi-phase digital encoding scheme by applying two or more different transition-detection filters to the sequence of digital samples; and (d) decoding the detected transitions to recover the binary data.

2. The method of claim 1, wherein:
the binary data is transmitted from the power receiver to the power transmitter;
the method is implemented by the power transmitter;
the binary data is modulated onto the power signal using amplitude shift keying (ASK) modulation;
the first coil is the primary coil in the power transmitter; and
the digital samples represent amplitude of the power signal.

3. The method of claim 1, wherein the power transmitter implements the method.

4. The method of claim 1, wherein the power receiver implements the method.

5. The method of claim 1, wherein:
the binary data is transmitted from the power transmitter to the power receiver;
the method is implemented by the power receiver;
the binary data is modulated onto the power signal using frequency-shift keying (FSK) modulation;
the first coil is the secondary coil in the power transmitter; and
the digital samples represent the period of the power signal.

6. The method of claim 5, wherein:
step (a) comprises squaring up the analog signal using a zero-crossing detector circuit to generate the processed analog signal as a squared-up waveform; and
step (b) comprises sampling the squared-up waveform using one of (i) a sequence of the rising edges or (ii) a sequence of falling edges of the squared-up waveform to trigger a timer that measures periods of cycles of the squared-up waveform, wherein each digital sample represents a measured period of a different cycle of the squared-up waveform.

7. In a wireless charging system comprising a power transmitter and a power receiver, wherein a primary coil in the power transmitter wirelessly transmits a power signal to a secondary coil in the power receiver, a method implemented by one of the power transmitter and the power receiver for recovering binary data modulated on the power signal using a bi-phase digital encoding scheme, the method comprising:

(a) processing an analog signal corresponding to voltage in a first coil of the wireless charging system using analog circuitry to generate a processed analog signal, wherein the first coil is one of the primary coil and the secondary coil;

(b) sampling the processed analog signal to generate a sequence of digital samples;

(c) detecting transitions in the sequence of digital samples associated with the bi-phase digital encoding scheme by applying two or more different transition-detection filters to the sequence of digital samples; and (d) decoding the detected transitions to recover the binary data, wherein the two or more different transition-detection filters comprise two or more of:

a first transition-detection filter algorithm comprising detecting a transition only if amplitudes of the digital samples are determined to correspond to expected sample amplitudes;

a second transition-detection filter algorithm comprising:
(A1) calculating a first average of a first N of the digital samples, N>1;
(A2) calculating a second average of a subsequent N of the digital samples;
(A3) calculating a first difference between the first and second averages; and
(A4) detecting a first transition candidate when the magnitude of the difference exceeds a first specified threshold value;

a third transition-detection filter algorithm comprising:
(C1) detecting a valid low-to-high transition only if a most-recent bit 0 in the binary data was encoded at a high sample level; and
(C2) detecting a valid high-to-low transition only if the most-recent bit 0 in the binary data was encoded at a low sample level;

a fourth transition-detection filter algorithm comprising:
(B1) calculating a first weighted average using a first set of the digital samples corresponding to a sliding window;
(B2) calculating a second weighted average using a second set of the digital samples corresponding to the sliding window;
(B3) calculating a second difference between the first and second weighted averages; and
(B4) detecting a second transition candidate when the magnitude of the second difference exceeds a second specified threshold value; and a fifth transition-detection filter algorithm comprising detecting a transition only if timing of the transition is determined to correspond to an expected transition time.

8. The method of claim 7, wherein:
the two or more different transition-detection filters comprise the second transition-detection filter and the fourth transition-detection filter; and
step (c) comprises detecting a transition only if the first transition candidate corresponds with the second transition candidate.

9. The method of claim 8, wherein the two or more different transition-detection filters further comprise the third transition-detection filter.

10. The method of claim 8, wherein the two or more different transition-detection filters further comprise the fifth transition-detection filter.

11. The method of claim 8, wherein the two or more different transition-detection filters further comprise the first transition-detection filter.

12. The method of claim 8, wherein the two or more different transition-detection filters further comprise the first, third, and fifth transition-detection filters.

13. In a wireless charging system comprising a power transmitter and a power receiver, wherein a primary coil in the power transmitter wirelessly transmits a power signal to a secondary coil in the power receiver, a method implemented by one of the power transmitter and the power receiver for recovering binary data modulated on the power signal using a bi-phase digital encoding scheme, the method comprising:

(a) processing an analog signal corresponding to voltage in a first coil of the wireless charging system using analog circuitry to generate a processed analog signal, wherein the first coil is one of the primary coil and the secondary coil;

(b) sampling the processed analog signal to generate a sequence of digital samples;

(c) detecting transitions in the sequence of digital samples associated with the bi-phase digital encoding scheme by applying two or more different transition-detection filters to the sequence of digital samples; and
(d) decoding the detected transitions to recover the binary data, wherein step (b) comprises:
periodically sampling the processed analog signal at a sequence of sampling times separated by a normal sampling interval corresponding to an integer multiple of a cycle of the processed analog signal; and
the sampling times are based on results of a calibration process in which the processed analog signal is sampled at calibration sampling times separated by a calibration sampling interval that is different from the normal sampling interval to generate a sequence of calibration samples that approximates samples generated by sampling the processed analog signal multiple times over a single cycle of the processed analog signal.

14. The method of claim 13, wherein the calibration sampling interval is longer than the normal sampling interval.

15. The method of claim 1, wherein:
steps (c) and (d) are implemented in a micro-controller unit (MCU) of a node in the wireless charging system that can function in either a power-transmitter mode or a power-receiver mode;
when the node functions in the power-transmitter mode, (i) the power signal is an ASK-modulated power signal and (ii) the MCU implements steps (c) and (d) to recover the binary data from the ASK-modulated power signal; and
when the node functions in the power-receiver mode, (i) the power signal is an FSK-modulated power signal and (ii) the MCU implements steps (c) and (d) to recover the binary data from the FSK-modulated power signal.

16. The method of claim 1, wherein the power transmitter implements the method.

17. The method of claim 1, wherein the power receiver implements the method.

* * * * *